United States Patent
Wise et al.

(10) Patent No.: US 12,207,596 B2
(45) Date of Patent: Jan. 28, 2025

(54) PELLET INSERTION APPARATUS AND RELATED METHODS

(71) Applicant: BOARD OF TRUSTEES OF MICHIGAN STATE UNIVERSITY, East Lansing, MI (US)

(72) Inventors: John C. Wise, Bath, MI (US); Alfred K. Wise, Perry, OK (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 151 days.

(21) Appl. No.: 17/910,689

(22) PCT Filed: Mar. 12, 2021

(86) PCT No.: PCT/US2021/022033
§ 371 (c)(1),
(2) Date: Sep. 9, 2022

(87) PCT Pub. No.: WO2021/183840
PCT Pub. Date: Sep. 16, 2021

(65) Prior Publication Data
US 2023/0138405 A1  May 4, 2023

Related U.S. Application Data

(60) Provisional application No. 62/989,243, filed on Mar. 13, 2020.

(51) Int. Cl.
*A01G 13/10* (2006.01)
*A01G 23/00* (2006.01)
*A01M 1/20* (2006.01)

(52) U.S. Cl.
CPC ............. *A01G 13/10* (2013.01); *A01G 23/00* (2013.01); *A01M 1/20* (2013.01)

(58) Field of Classification Search
CPC .......... A01G 7/06; A01G 23/00; A01G 13/10; A01G 25/09; A01M 7/006; A01M 7/001
(Continued)

(56) References Cited

U.S. PATENT DOCUMENTS

| 809,046 A | * | 1/1906 | Collins | ............... A01M 7/0064 239/222.11 |
| 4,698,935 A | | 10/1987 | Cronenwett et al. | |

(Continued)

FOREIGN PATENT DOCUMENTS

| CN | 107409571 A | 12/2017 |
| GB | 2487721 B | 4/2013 |

(Continued)

OTHER PUBLICATIONS

European Patent Application No. 21768080.0, Extended European Search Report, dated Aug. 28, 2023.
(Continued)

*Primary Examiner* — Brady W Frazier
*Assistant Examiner* — Zoe Tam Tran
(74) *Attorney, Agent, or Firm* — MARSHALL, GERSTEIN & BORUN LLP (57) ABSTRACT

Pellet insertion apparatus and methods. In accordance with an example, a method of inserting a pellet in a tree includes extending a taper (108) and an actuator rod (118) into the tree. The actuator rod (118) positioned within a through-bore (110) and extending from a taper distal end (112). The method includes securing the taper (108) in the extended position. The method includes retracting the actuator rod (118). The method includes loading a plug into the through-bore (110) of the taper (108). The method includes moving the actuator rod (118) to a plug insertion position.

26 Claims, 6 Drawing Sheets

(58) Field of Classification Search
USPC .................................................. 47/57.5, 1.7
See application file for complete search history.

(56) References Cited

U.S. PATENT DOCUMENTS

| | | |
|---|---|---|
| 5,086,584 A | 2/1992 | Merving |
| 5,239,773 A * | 8/1993 | Doolittle, Jr. .......... A01G 29/00 |
| | | 47/57.5 |
| 7,252,042 B1 * | 8/2007 | Blake ..................... A01C 15/02 |
| | | 111/95 |
| 10,624,272 B1 * | 4/2020 | Doolittle ................. A01G 7/06 |
| 2013/0326944 A1 | 12/2013 | Obrist et al. |

FOREIGN PATENT DOCUMENTS

| | | |
|---|---|---|
| WO | WO-2014/094056 A1 | 6/2014 |
| WO | WO-2018/169904 A1 | 9/2018 |

OTHER PUBLICATIONS

International Application No. PCT/US2021/022033, International Search Report and Written Opinion, dated Jun. 22, 2021.

\* cited by examiner

PELLET INSERTION APPARATUS AND RELATED METHODS

CROSS REFERENCE TO RELATED APPLICATION

This application is a 35 U.S.C. § 371 National Stage of U.S. National Phase of International Application PCT/US21/22033, filed Mar. 12, 2021, which claims priority to U.S. Provisional Application No. 62/989,243, filed Mar. 13, 2020, the content of each of which is incorporated by reference herein in their entireties and for all purposes.

STATEMENT OF GOVERNMENT INTEREST

None.

FIELD OF THE DISCLOSURE

The disclosure relates to pellet insertion apparatus and, in particular, to pellet insertion apparatus and related methods for inserting a plug into a tree to protect the tree against pests. The plug may be a slow-release biodegradable composite pesticide plug.

BACKGROUND OF THE DISCLOSURE

Tree fruit producers currently rely upon airblast ground sprayers to deliver pesticides to their orchards to control insect and disease pests. Unfortunately, airblast sprayers are a relatively inefficient means of delivering pesticides to their target, with only 29 to 56% of the applied spray solution being deposited on the tree canopy, and the remaining product drifting to ground or other off-target end points. Pest management inputs comprise 30% or more of the total annual variable costs in fruit production and they significantly influence marketable yield. Trunk injection represents an alternate technology for the delivery of pesticides to tree fruit crops. Arborists have developed a variety of techniques for injecting pesticides directly into tree trunks, which then can be translocated from the injection site to the canopy area of insect feeding or disease infection. This technology has been successfully used in protecting ash trees from the Emerald ash borer (EAB) in urban and suburban landscapes because of minimal risks of applicator exposure, drift and impacts on non-target organisms, and superior duration of control compared to foliar application.

The commercial ARBORJET QUIK-JET system relies upon drilling a hole in the trunk, and injecting a pesticide solution into the cavity, after which the xylem translocates the material to the tree canopy. The ARBORSYSTEMS WEDGLE drills a shallow hole into the tree trunk, and then makes a pressure injection of liquid solution into the cambial zone of the trunk. These types of injection techniques result in a temporally variable residue profile in the tree canopy, resulting in unnecessarily high doses of insecticide. Another trunk injection technology, the ACECAP Systemic Insecticide Tree Implant, inserts a capsule containing the pesticide into the tree trunk. After the pesticide is released, however, the capsule remains as a contaminant that hinders tree healing. Both of these commercial systems can cause unacceptable injury to the tree trunk, thus hindering potential adoption in the tree fruit industry. The commercial BITE-INFUSION system avoids drilling large holes in the tree by slowly infusing the pesticide into the trunk with a needle-based system and pressure. This system can require an inordinate amount of time to inject a single tree, thus lower its potential for use in a tree fruit orchard system.

Accordingly, it would be desirable to provide a uniform dose of pesticide active ingredient to the tree throughout the growing season in a time- and labor-efficient manner which also enhances the healing of the tree after injection.

SUMMARY

In accordance with a first example, a pellet insertion apparatus 100 for use with trees includes a housing 102, a taper 108, a lock 116, and an actuator rod 118. The housing 102 defines a guide bore 104 and a pellet orifice 106. The pellet orifice 106 is coupled to the guide bore 104. The taper 108 is movable between an extended position and a release position within the guide bore 104 and defines a through-bore 110. The taper 108 includes a taper distal end 112 and a taper proximal end 114. The taper distal end 112 is adapted to penetrate a trunk of a tree and extend at least partially into or adjacent to xylem tissue of the tree for pellet insertion. The lock 116 is coupled to the housing 102 and is adapted to secure the taper 108 in the extended position. The actuator rod 118 is movable within the through-bore 110 between an extended position, a retracted position, and a plug insertion position. The actuator rod 118 has a rod distal portion 120, a rod central portion 122, and a rod proximal portion 124. The rod distal portion 120 is adapted to extend from the taper distal end 112 when the actuator rod 118 is in the extended position. The rod distal portion 120 in the extended position is adapted to penetrate the trunk of the tree and extend at least partially into or adjacent to the xylem tissue of the tree for pellet insertion. The actuator rod 118 in the retracted position is retracted such that the pellet insertion apparatus 100 is adapted to receive a pellet via the pellet orifice 106 into the through-bore 110. Movement of the actuator rod 118 between the retracted position and the plug insertion position is adapted to insert a received pellet in the through-bore 110 into the tree, when the taper 108 is secured in the extended position in the tree.

In accordance with a second example, a pellet insertion apparatus 100 for use with trees includes a housing 102, a taper 108, an actuator rod 118, and an actuator 126. The housing 102 defines a guide bore 104 and a pellet orifice 106. The pellet orifice 106 is coupled to the guide bore 104. The taper 108 is movable within the guide bore 104 between an extended position and a release position and defines a through-bore 110. The taper 108 includes a taper distal end 112 and a taper proximal end 114. The taper distal end 112 is adapted to penetrate a trunk of a tree and extend at least partially into or adjacent to xylem tissue of the tree for pellet insertion. The actuator rod 118 is movable within the through-bore 110 between an extended position, a retracted position, and a plug insertion position. The actuator rod 118 has a rod distal portion 120 and a rod proximal portion 124. The rod distal portion 120 is adapted to extend from the taper distal end 112 when the actuator rod 118 is in the extended position. The actuator 126 is coupled to the actuator rod 118 and is adapted to actuate the actuator rod 118 between the extended position, the retracted position, and the plug insertion position. The rod distal portion 120 in the extended position is also adapted to penetrate the trunk of the tree and extend at least partially into or adjacent to xylem tissue of the tree for pellet insertion. The actuator rod 118 in the retracted position is retracted such that the pellet insertion apparatus 100 is adapted to receive a pellet via the pellet orifice 106 into the through-bore 110. Movement of the actuator rod 118 between the retracted position and the plug insertion position is adapted to insert a received pellet in the through-bore 110 into the tree, when the taper 108 is secured in the extended position in the tree.

In accordance with a third example, a method of inserting a pellet or plug in a tree includes extending a taper 108 and an actuator rod 118 into a tree. The taper 108 and the actuator rod 118 penetrate a trunk of the tree and extend at least partially into or adjacent to xylem tissue of the tree. The actuator rod 118 is positioned within a through-bore 110 of the taper 108 and extends from a taper distal end 112. The method includes securing the taper 108 in the extended position within the tree. The method includes retracting the actuator rod 118. The method includes loading a pellet or plug into the through-bore 110 of the taper 108. The method includes moving the actuator rod 118 to a plug insertion position, thereby inserting the pellet into the tree. The method can further include retracting the taper 108 from the tree, thereby leaving the pellet inserted in the tree. The method can be performed using the pellet insertion apparatus 100 according to any of the variously disclosed examples herein.

In further accordance with the foregoing first, second and/or third examples, an apparatus and/or method may further include any one or more of the following:

In accordance with one example, the apparatus further includes an actuator 126 coupled to the actuator rod 118 and adapted to actuate the actuator rod 118 between the extended position, the retracted position, and the plug insertion position.

In accordance with another example, the lock 116 is further adapted to secure the taper 108 in the release position.

In accordance with another example, the rod central portion 122 includes a release flange 128. The release flange 128 is adapted to engage the taper proximal end 114 to move the taper 108 toward the extended position. The release flange 128 is further adapted to engage the lock 116 to release the taper 108 from being secured in the extended position.

In accordance with another example, the lock 116 includes at least two (e.g., a pair of) spring-biased arms 130 rotatably coupled to opposing sides 132, 134 of the housing 102 and having inward facing teeth 136.

In accordance with another example, the taper proximal end 114 includes a taper catch 138. The arms 130 are adapted to interface with the taper catch 138 to secure the taper 108 in the extended position.

In accordance with another example, the release flange 128, via the actuator rod 118, is rotatable between a first position and a second position. In the first position, the release flange 128 is passable between the arms 130 to engage the taper catch 138 and move the taper 108 toward the extended position. In the second position, the release flange 128 is adapted to engage and outwardly move the arms 130 to release the taper 108 from the extended position.

In accordance with another example, the taper distal end 112 includes a chisel-shaped portion 140.

In accordance with another example, a spring 142 is positioned to bias the taper 108 away from the extended position.

In accordance with another example, the apparatus further includes a base 127, a handle 200, and tires 202. The tires 202 and the handle 200 are coupled to the base 127.

In accordance with another example, the apparatus further includes a pair of brackets 206 to which a strap is adapted to be coupled to secure the pellet insertion apparatus 100 to the tree.

In accordance with another example, the apparatus further includes an actuator shaft 150 coupled to and actuatable by the actuator 126. The actuator shaft 150 extending in an opposite direction relative to the actuator rod 118.

In accordance with another example, the actuator 126 includes a first actuator end 152 and a second actuator end 154. The actuator rod 118 extending from the first actuator end 152. The actuator shaft 150 extending from the second actuator end 154. Further including a stop 156 coupled adjacent to the second actuator end 154.

In accordance with another example, the actuator shaft 150 has a distal shaft end 158 and a central shaft portion 160 carrying a stroke-distance control flange 162. The stroke-distance control flange 162, via the actuator shaft 150, is rotatable between the first position and the second position. In the first position, the stroke-distance control flange 162 is passable between the stop 156 to move the rod distal portion 120 to extend from the taper 108. In the second position, the stroke-distance control flange 162 to engage the stop 156 to limit forward movement of the rod distal portion 120 relative to the taper 108.

In accordance with another example, the apparatus further includes a gear assembly 164 adapted to rotate the actuator shaft 150 between the first position and the second position.

In accordance with another example, the gear assembly 164 includes a first bevel gear 174 and a second bevel gear 176. The first bevel gear 174 surrounds and rotates with the actuator shaft 150. The second bevel gear 176 is arranged to interface with and rotate the first bevel gear 174.

In accordance with another example, the apparatus further includes a pivot 166 including a first pivot portion end 168 and a second pivot portion end 170. The rod distal portion 120 is adapted to engage the first pivot portion end 168. The second pivot portion end 170 is adapted to interface with the gear assembly 164 to rotate the actuator shaft 150.

In accordance with another example, a spring 172 is coupled to the pivot 166 and is arranged to bias the first pivot portion end 168 toward the distal rod portion 120.

In accordance with another example, a pusher shaft 178 is coupled to the second pivot portion end 170 and a ratchet 180 is coupled to rotate with the second bevel gear 176. The pusher shaft 178 is adapted to interface with and correspondingly rotate the ratchet 180 in a first direction.

In accordance with another example, a cam 183 is coupled to rotate with the ratchet 180 and a follower 184 is adapted to follow the cam 183. An interaction between the follower 184 and the cam 183 is to prevent rotation of the cam 183 in a second direction opposite the first direction.

In accordance with another example, the apparatus further includes a wall 186 defining a through-bore 188 and a gear assembly shaft 190 extending through the through-bore 188. The second bevel gear 176, the ratchet 180, and the cam 183 are coupled to rotate with the gear assembly shaft 190. The follower 184 is rotatably coupled to the wall 186.

In accordance with another example, the apparatus further includes a pair of spaced apart mounts 192, 194. Each mount 192, 194 defines a through-bore 196, 198. The actuator shaft 150 is journaled within the corresponding through-bores 196, 198.

In accordance with another example, further including a base 127 to which the housing 102 is coupled. The base 127 includes a pair of fork pockets 206.

BRIEF DESCRIPTION OF THE DRAWINGS

For a more complete understanding of the disclosure, reference should be made to the following detailed description and accompanying drawings wherein.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

The examples disclosed herein relate to a pellet or plug insertion apparatus for use with trees. As used herein, "pellet" and "plug" are generally synonymously used to describe a structure, typically having a cylindrical or rod-like shape, that contains an active ingredient for promoting tree health and that releases the active ingredient once inserted into a tree trunk. The example pellet insertion apparatus uses a taper and an actuator rod to penetrate the tree and thereafter insert a pellet into the tree. The taper and the actuator rod may be adapted to be inserted into the tree a threshold amount. Thus, pellets may be inserted into different trees at a similar or the same depth. After pellet insertion, the taper and actuator rod are retracted such that the actuator rod holds the pellet in place when the taper initially retracts. For example, once the taper retracts beyond the pellet length, the actuator rod can be withdrawn (e.g., in combination with further taper retraction) with the pellet remaining in its inserted position.

In some examples, the taper may be chisel shaped and may be inserted into the tree along the grain of the tree. As a result, the pellet insertion apparatus are adapted to quickly insert the pellet into the tree with minimal injury to the tree.

The pellet may be designed such that, after insertion into the tree, it provides a controlled release of active ingredients in both in terms of spatial distribution in the tree canopy and also temporal duration across the length of the growing season. The pellet may be a slow- or timed-release pellet or plug delivering any desired active ingredient to tree tissues, for example a pesticide or insecticide plug. Other types of pellets may prove suitable. Examples of such active ingredients can include any of the various plant protection materials know in the art for promoting tree health, such as materials which kill or inactivate tree pests, increase a tree's resistance to pests, and/or promote tree growth, for example including pesticides, biopesticides, plant growth regulators, and fertilizers, etc. Wise et al. WO 2018/169904 provides a description of suitable plugs for delivering pesticides and other active ingredients, and it is incorporated herein by reference in its entirety.

Figure 1:
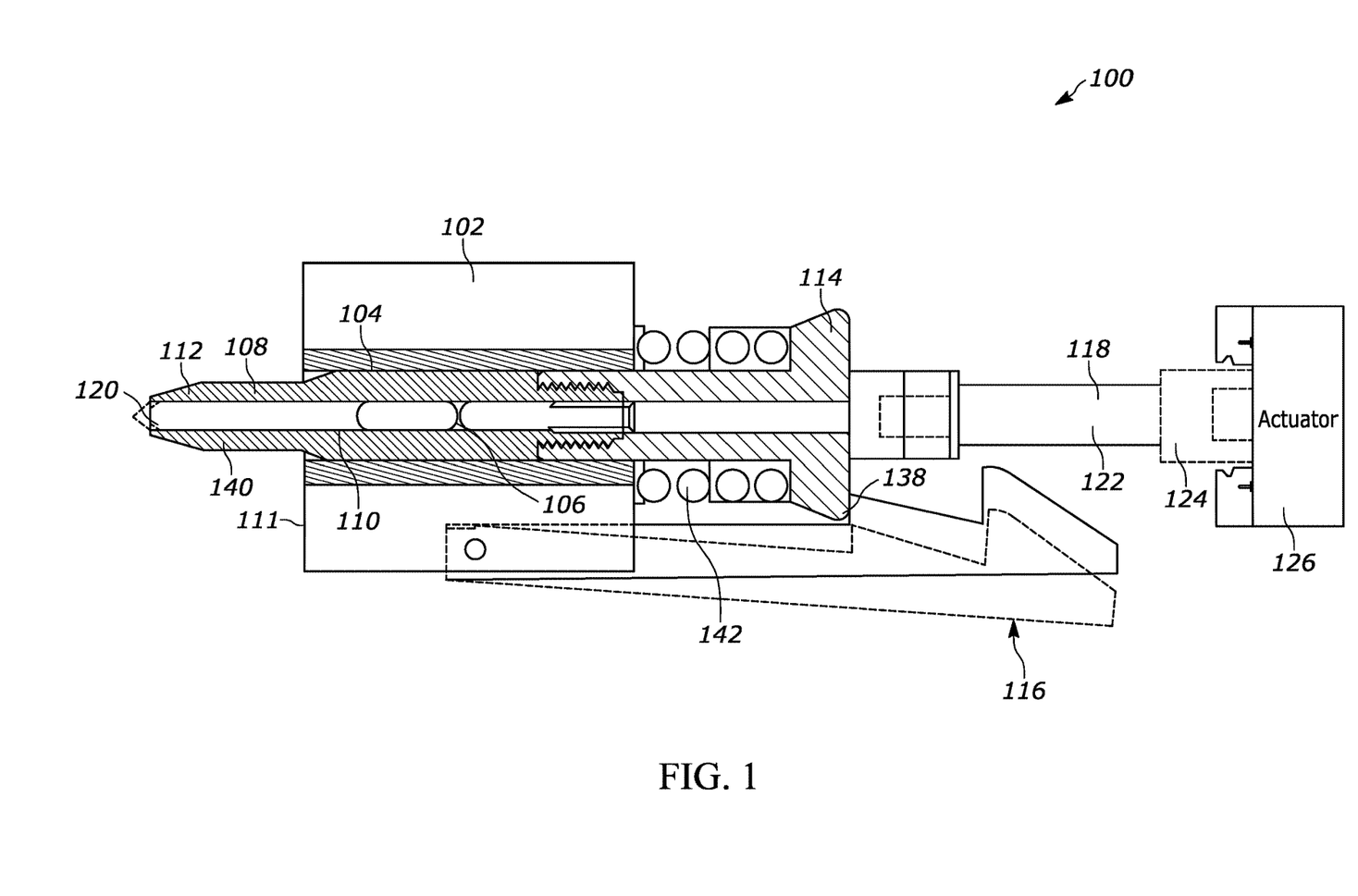
FIG. 1 is a cross-sectional view of a portion of a pellet insertion apparatus in accordance with a first example of the present disclosure.

Referring now to the drawings, FIG. 1 is a cross-sectional view of a portion of a pellet insertion apparatus 100 in accordance with a first example of the present disclosure. In the example shown, the pellet insertion apparatus 100 includes a housing 102 defining a guide bore 104 and a pellet orifice 106 (the pellet orifice 106 is more clearly shown in FIG. 2). The pellet orifice 106 is coupled to the guide bore 104.

The pellet orifice 106 may be a slot that is positioned approximately 90 degrees relative to the guide bore 104. The coupling between the pellet orifice 106 and the guide bore 104 allows a pellet (not shown) to be loaded into the guide bore 104.

A cross-section of the pellet orifice 106 may be oblong or may otherwise correspond to a shape of the pellet. In some examples, the pellet is fed into the pellet orifice 106 by an operator. In another example, a hopper (not shown) coupled to the pellet insertion apparatus 100 feeds a pellet orifice 106.

Figure 3:
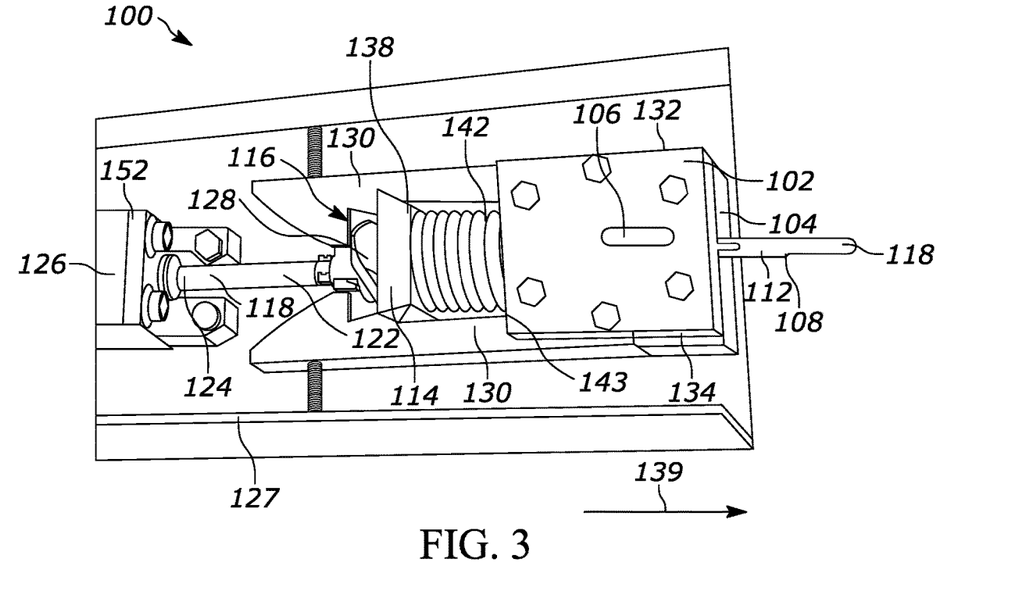
FIG. 3 is a detailed top isometric view of a front portion of the pellet insertion apparatus of FIG. 1 showing the taper and the actuator rod in the extended position.

The pellet insertion apparatus 100 includes a taper 108. The taper 108 is movable between an extended position and a release position within the guide bore 104. FIGS. 1 and 3 illustrate the taper 108 in the extended position. In the extended position, the taper 108 extends from a front face 111 of the housing 102. In the retracted position, the taper 108 may not substantially extend from the front face 111 of the housing 102 and/or the taper 108 may be flush relative to the flush face 111 (see, for example, FIGS. 7 and 8).

In the example shown, the taper 108 defines a through-bore 110. The taper 108 also includes a taper distal end 112 and a taper proximal end 114. The taper distal end 112 is adapted to penetrate a trunk of a tree and extend at least partially into or adjacent to xylem tissue of the tree. Penetrating the tree with the taper 108 and actuator rod 118 (described below) allows for the pellet to later to be inserted within the tree. Put another way, the taper 108 and the actuator rod 118 penetrate the trunk of a tree, and extend far enough into the xylem tissue for plug placement. In particular, forward motion of the taper 108 and the actuator rod 118 together into the tree trunk provides a compressive force that displaces tree trunk tissues horizontally, so as to minimize injury to vertically-oriented vascular tissues, allowing recovery of the tree after the plug is inserted and the actuator is removed. In contrast to drilling or other more destructive methods for pellet insertion, the disclosed apparatus does not remove substantial amounts of tissue from the tree. This creates an open space within the tree interior for pellet insertion, in particular after retraction of the actuator rod 118 (described below) while maintain the taper 108 in an inserted position.

A lock 116 is coupled to the housing 102. The lock 116 is adapted to secure the taper 108 in the extended position. The lock 116 may also be adapted to secure the taper 108 in the release position. The details of the lock 116 are further discussed below.

In the example shown, an actuator rod 118 is movable within the through-bore 110 between an extended position, a retracted position, and a plug insertion position. The actuator rod 118 has a rod distal portion 120, a rod central portion 122, and a rod proximal portion 124. The rod distal portion 120 is adapted to extend from the taper distal end 112 when the actuator rod 118 is in the extended position. Thus, the rod distal portion 120 in the extended position is also adapted to penetrate the trunk of the tree and extend at least partially into or adjacent to the xylem tissue of the tree. Extending the actuator rod 118 from the through-bore 110 and the taper 108 substantially prevents particles of the tree from clogging the through-bore 110 when the taper 108 penetrates the trunk of the tree and extends at least partially into or adjacent to xylem tissue of the tree. Subsequent retraction of the actuator rod 118 provides space within the through-bore 110 and within the tree to receive and insert a pellet.

The actuator rod 118 in the retracted position is retracted such that the pellet insertion apparatus 100 is adapted to receive a pellet via the pellet orifice 106 into the through-bore 110. Moreover, movement of the actuator rod 118 between the retracted position and the plug insertion position is adapted to insert a received pellet in the through-bore 110 into the tree, when the taper 108 is secured in the extended position in the tree. In the plug insertion position, the actuator rod 118 may extend partially forward with the difference between the extended position and the plug insertion position being, for example, a length of the plug. In some embodiments, when the taper 108 is retracted from its extended position after pellet insertion, the actuator rod 118 can remain in the pellet insertion position to hold the pellet in place. After the taper 108 retracts past the pellet insertion position of the actuator rod 118, the taper 108 and rod 118 can be withdrawn together or separately while the pellet remains inserted in the tree.

An actuator 126 is coupled to the actuator rod 118. The actuator 126 may be a hydraulic actuator, a pneumatic actuator, an electric actuator, etc. Other types of actuators may prove suitable. In the example shown, the actuator 126 is adapted to actuate the actuator rod 118 between the extended position, the retracted position, and the plug insertion position.

Figure 2:
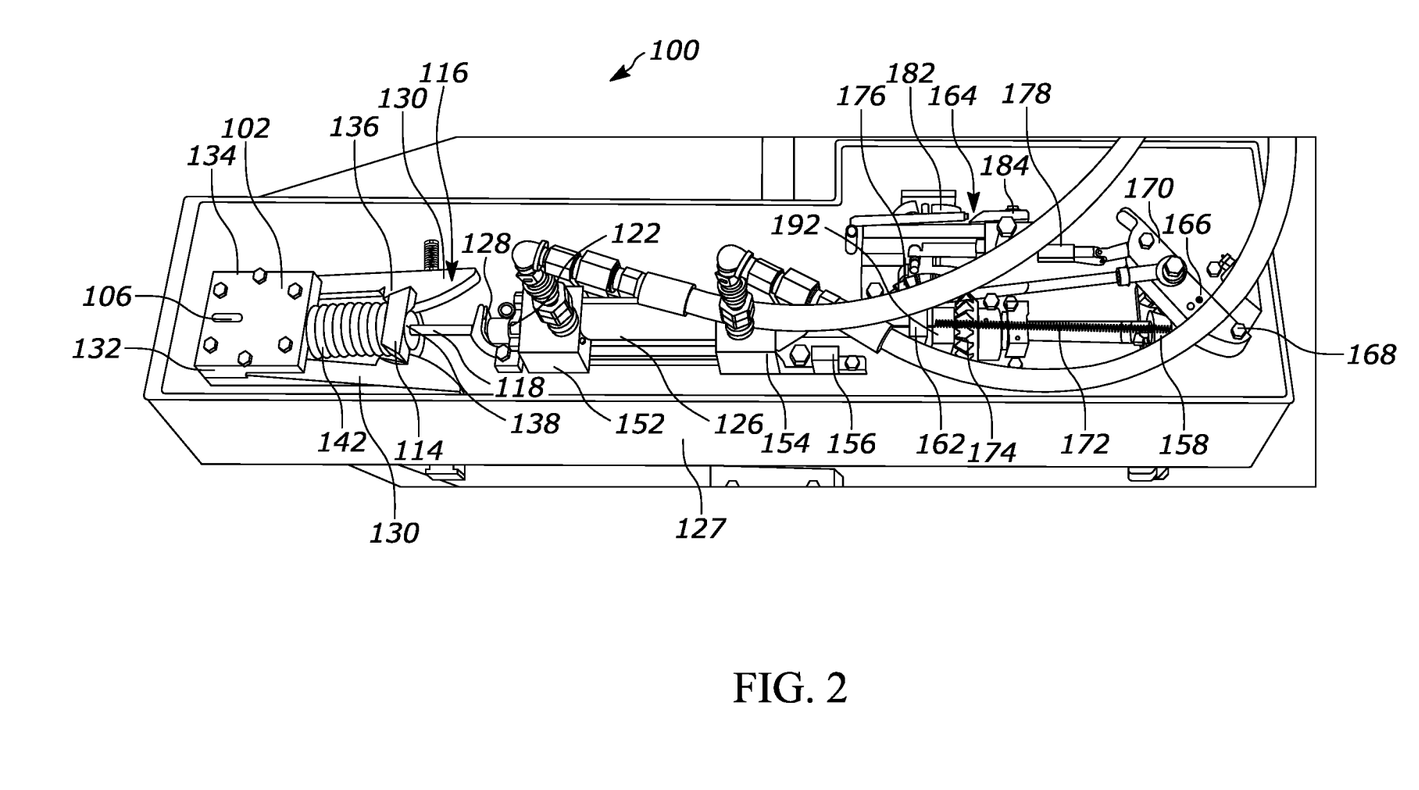
FIG. 2 is a top isometric view of the pellet insertion apparatus of FIG. 1.

FIG. 2 is a top isometric view of the pellet insertion apparatus 100 of FIG. 1. The housing 102 and the actuator 126 are shown coupled to a base 127.

In the example shown, the rod central portion 122 includes a release flange 128. The release flange 128 is adapted to engage the taper proximal end 114 to move the taper 108 toward the extended position. The release flange 128 is further adapted to engage the lock 116 to release the taper 108 from being secured in the extended position.

The lock 116 includes a pair of spring-biased arms 130. The arms 130 are rotatably coupled to opposing sides 132, 134 of the housing 102 and have inward facing teeth 136. When the release flange 128 is oriented vertically, the release flange 128 can pass between the arms 130 and engage and move the taper 108 forward. The taper proximal end 114 includes a taper catch 138. The arms 130 are adapted to interface with the taper catch 138 to secure the taper 108 in the extended position. The extended position is when the taper 108 is moved forward relative to the housing 102 allowing the taper 108 to, for example, penetrate the tree. In the example shown, the teeth 136 are engaging with the taper catch 138 and are securing the taper 108 in the release position.

In operation, the release flange 128, via the actuator rod 118, is rotatable between a first position and a second position. In the first position, the release flange 128 is passable between the arms 130 of the lock 116 to engage the taper catch 138 and move the taper 108 toward the extended position. In the second position, the release flange 128 is adapted to engage and outwardly move the arms 130 to release the taper 108 from the extended position. The release flange 128 may be vertically oriented in the first position and horizontally oriented in the second position.

FIG. 3 is a detailed top isometric view of a front portion of the pellet insertion apparatus 100 of FIG. 1 showing the taper 108 and the actuator rod 118 in the extended position. The release flange 128 is shown in the first position engaging the taper proximal end 114 and urging the taper 108 in a direction generally indicated by arrow 139.

The taper distal end 112 includes a chisel-shaped portion 140 (the chisel-shaped portion 140 is more clearly shown in FIG. 1). In some examples, the chisel-shaped portion 140 is vertically oriented to allow the chisel-shaped portion 140 to penetrate between the grains of the tree and reduce an amount of damage to the tree during the pellet-insertion process. The vertical, elongate orientation of the chisel portion 140 also generally aligns with the primary transport direction of internal tree transport tissues (e.g., xylem tissues), thus facilitating eventual release and transport of the pellet's active ingredient. The relative vertical orientation of the chisel portion 140 can be expressed as generally parallel to or aligned with the tree trunk, normal to the ground, and/or normal to a base or other support surface for the insertion apparatus 100.

Figure 4:
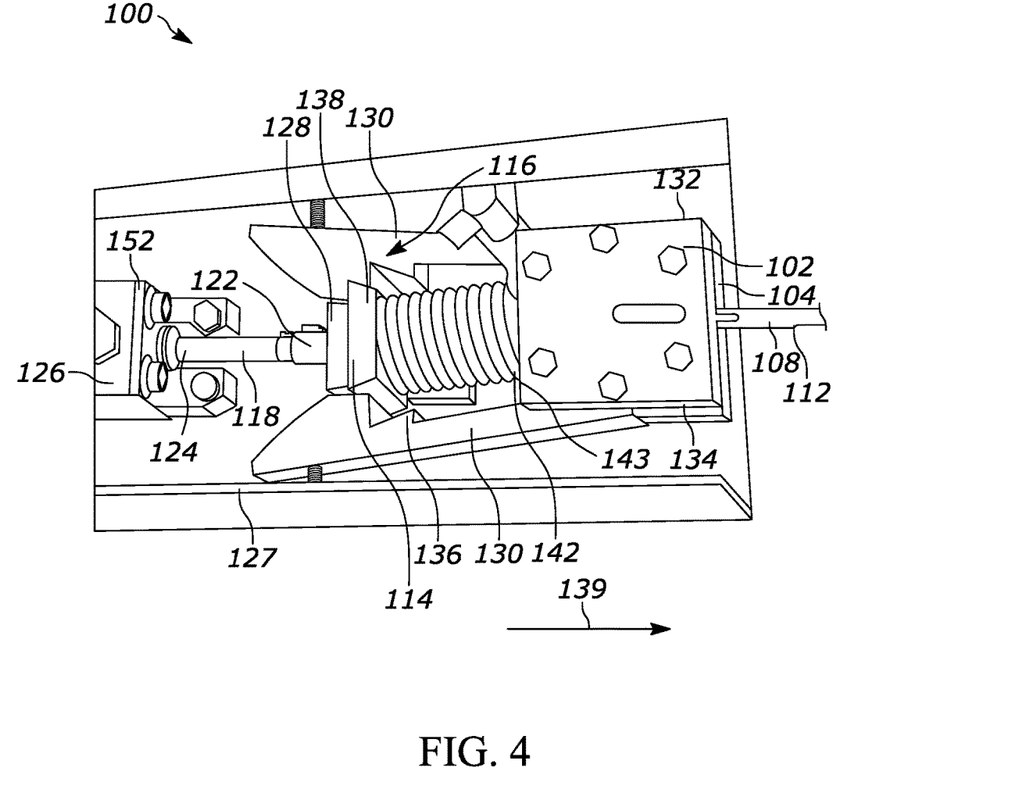
FIG. 4 is a detailed top isometric view of the front portion of the pellet insertion apparatus of FIG. 1 showing the taper and the actuator rod in the retracted position.

FIG. 4 is a detailed top isometric view of the front portion of the pellet insertion apparatus 100 of FIG. 1 showing the taper 108 and the actuator rod 118 in the retracted position. The release flange 128 is shown in the second position engaging the arms 130 and urging the arms 130 outwardly to release the taper 108. The release position is when the taper 108 is moved rearward relative to the housing 102 allowing for the taper 108 to be, for example, withdrawn from the tree.

A spring 142 is positioned to bias the taper 108 away from the extended position. The spring 142 is positioned between a face 143 of the housing 102 and the taper catch 138. The spring 142 urges the taper 108 in a direction opposite that represented by arrow 139.

Figure 5:
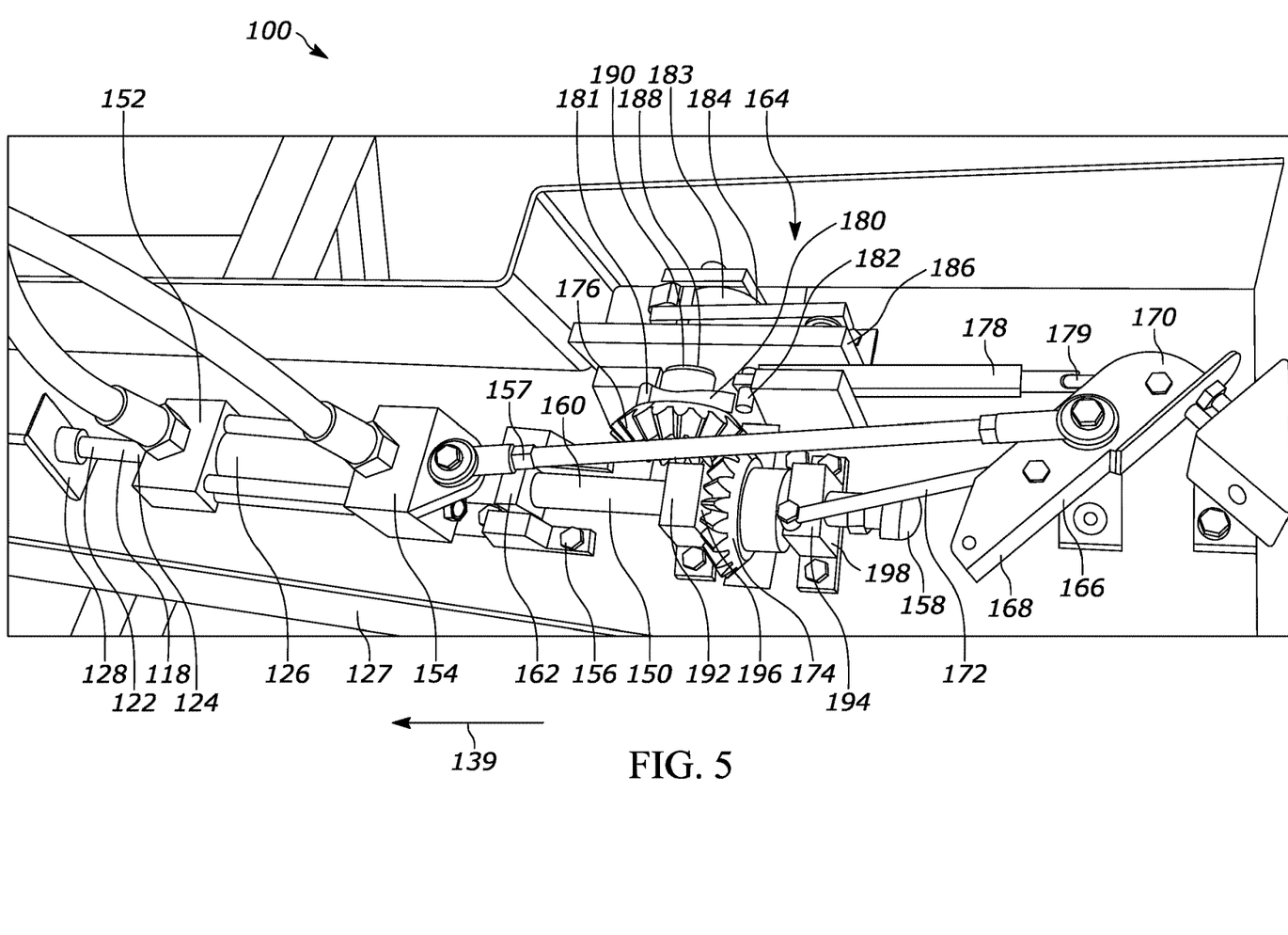
FIG. 5 is a detailed top isometric view of a rear portion of the pellet insertion apparatus of FIG. 1.

FIG. 5 is a detailed top isometric view of a rear portion of the pellet insertion apparatus 100 of FIG. 1. In the example shown, an actuator shaft 150 is coupled to and actuatable by the actuator 126. The actuator shaft 150 extends in an opposite direction relative to the actuator rod 118.

The actuator 126 has a first actuator end 152 and a second actuator end 154. The actuator rod 118 extends from the first actuator end 152 and the actuator shaft 150 extends from the second actuator end 154.

The actuator rod 118 and the actuator shaft 150 may linearly move together. For example, movement of the actuator rod 118 in the direction generally indicated by the arrow 139 may move the actuator shaft 150 in the same direction.

The actuator rod 118 and the actuator shaft 150 may rotationally move together. For example, rotating the actuator shaft 150 ninety degrees may similarly rotate the actuator rod 118 ninety degrees.

In the example shown, a stop 156 is coupled adjacent to the second actuator end 154. The stop 156 is coupled to the base 127. The stop 156 is formed of a pair of L-shaped walls 157. The L-shaped walls 157 open in a direction generally opposite the direction indicated by the arrow 139.

The actuator shaft 150 has a distal shaft end 158 and a central shaft portion 160 carrying a stroke-distance control flange 162. The stroke-distance control flange 162, via the actuator shaft 150, is rotatable between the first position and the second position.

In the first position, the stroke-distance control flange 162 is passable between the stop 156 to move the rod distal portion 120 to extend from the taper 108. When the stroke-distance control flange 162 is in the first position, the release flange 128 is also in the first position. Put another way and based on the example shown, in the first position, the flanges 128, 162 are both vertically oriented to allow the stroke-distance control flange 162 to pass between the stop 156 and further in a direction generally indicated by arrow and to allow the release flange 128 to pass between the arms 130.

In the second position, the stroke-distance control flange 162 engages the stop 156 to limit forward movement of the rod distal portion 120 relative to the taper 108. In the second position, the flanges 128, 162 are both horizontally oriented to allow the stroke-distance control flange 162 to engage the stop 156 and to allow the release flange 128 to engage the arms 130 and thereafter release the taper 108 from the secured/forward position.

In the example shown, the pellet insertion apparatus 100 includes a gear assembly 164. The gear assembly 164 is adapted to rotate the actuator shaft 150 between the first position and the second position. In the example shown, each time the actuator shaft 150 moves rearward, the gear assembly 164 is adapted to rotate the actuator shaft 150 approximately 90 degrees. However, the gear assembly 164 may be differently configured.

The gear assembly 164 includes a first bevel gear 174 and a second bevel gear 176. The first bevel gear 174 surrounds and rotates with the actuator shaft 150 and the second bevel gear 176 is arranged to interface with and rotate the first bevel gear 174.

A pivot 166 is provided including a first pivot portion end 168 and a second pivot portion end 170. The pivot 166 is pivotably coupled to the base 127. The rod distal portion 120 is adapted to engage the first pivot portion end 168 and the second pivot portion end 170 is adapted to interface with the gear assembly 164 to rotate the actuator shaft 150.

A spring 172 is coupled to the pivot 166 and arranged to bias the first pivot portion end 168 toward the distal rod portion 120. The spring 172 is a coil spring but other types of springs may be used.

In the example shown, a pusher shaft 178 is coupled to the second pivot portion end 170. The pusher shaft 178 is coupled to the pivot 166 via a universal joint 179. The universal joint 179 is a pivot joint. However, other types of couplings may prove suitable.

A ratchet 180 is coupled to rotate with the second bevel gear 176. The pusher shaft 178 is adapted to interface with and correspondingly rotate the ratchet 180 in a first direction.

In the example shown, the ratchet 180 includes rearward facing teeth 181 that a pusher shaft end 182 engage with. Movement of the pusher shaft 178 in a direction generally indicated by arrow 139 allows the pusher shaft end 182 and one of the rearward facing teeth 181 to interface such that the ratchet 180 rotates in a counterclockwise direction. Movement of the ratchet 180 in a counterclockwise direction rotates the second bevel gear 176 in a counterclockwise direction. Based on the engagement between the bevel gears 174, 176, movement of the second bevel gear 176 in the counterclockwise direction rotates the first bevel gear 174 and the actuator shaft 150 in the counter clockwise direction. Other arrangements may prove suitable.

A cam 183 is provided that is coupled to rotate with the ratchet 180. A follower 184 is included that is adapted to follow the cam 183. In the example shown, an interaction between the follower 184 and the cam 183 prevents rotation of the cam 183 in a second direction opposite the first direction. Specifically, the interaction between the follower 184 and the cam 183 prevents rearward rotation of the cam 183, the ratchet 180, the first bevel gear 174, and the second bevel gear 176. For example, when the actuator shaft 150 is in a forward position such as when the stroke-distance control flange 162 engages the stop 156 and the pusher shaft 178 is not urging the ratchet 180 forward as shown, the interaction between the follower 184 and the cam 183 deters rearward rotation of the cam 183 and the other components 180,174,176.

Figure 6:
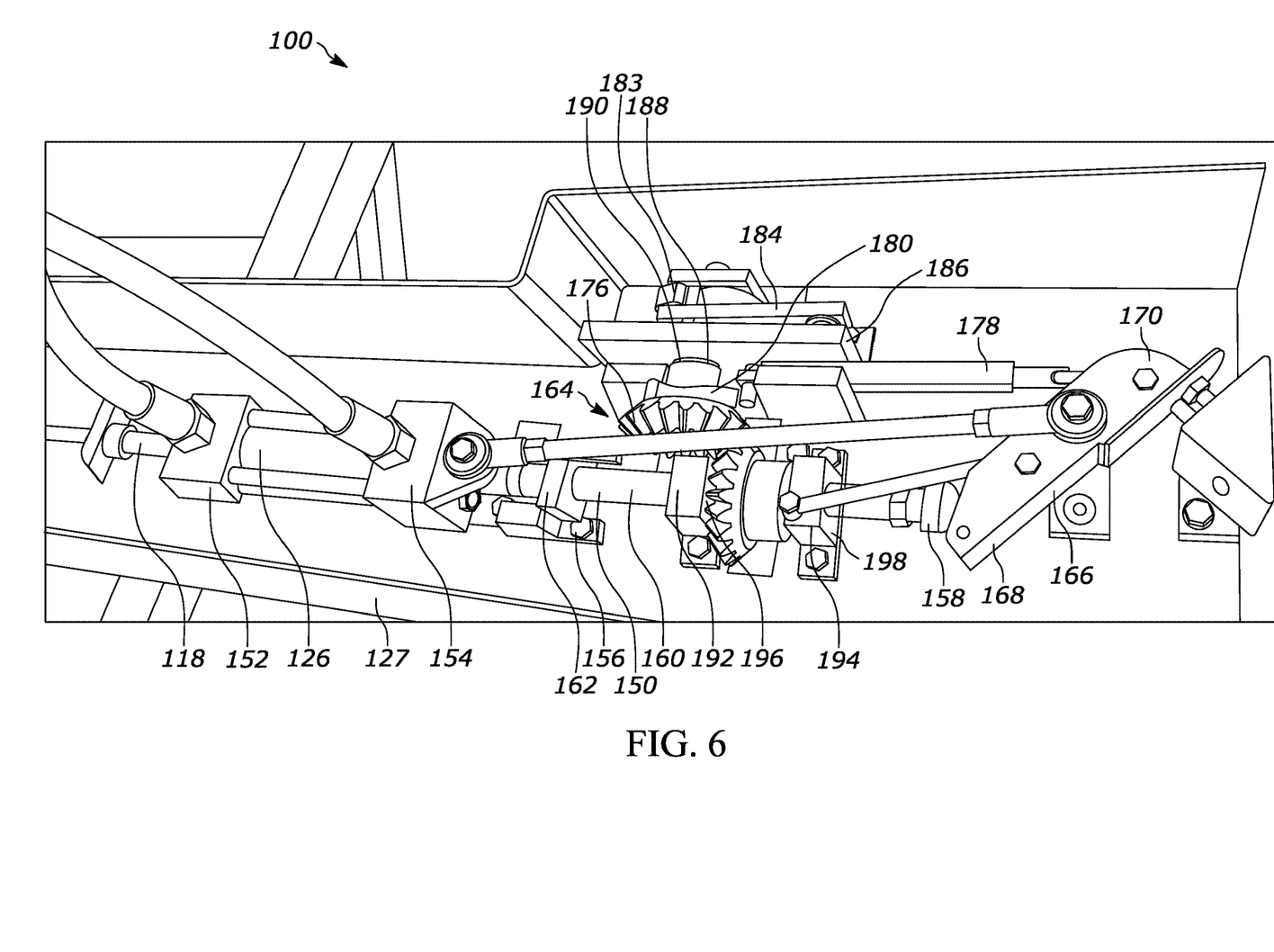
FIG. 6 is a detailed top isometric view of the rear portion of the pellet insertion apparatus of FIG. 1 showing the stroke-distance control flange engaging the stop.

FIG. 6 is a detailed top isometric view of a rear portion of the pellet insertion apparatus 100 of FIG. 1 showing the stroke-distance control flange 162 engaging the stop 156. A wall 186 is provided that defines a through-bore 188. The wall 186 is coupled to the base 127. A gear assembly shaft 190 is shown extending through the through-bore 188 of the wall 186. In the example shown, the second bevel gear 176, the ratchet 180, and the cam 183 are coupled to rotate with the gear assembly shaft 190. The follower 184 is rotatably coupled to the wall 186

A pair of spaced apart mounts 192, 194 are included. Each mount 192, 194 defines a corresponding through-bore 196, 198. The actuator shaft 150 is journaled within the corresponding through-bores 196, 198.

Figure 7:
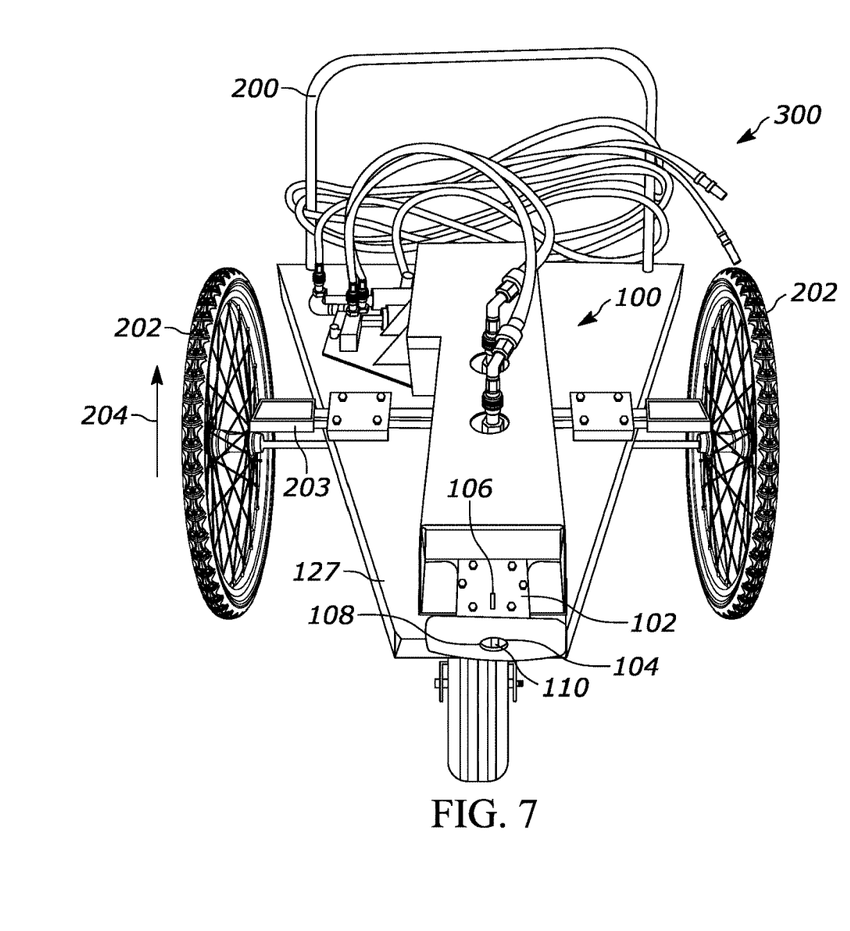
FIG. 7 is an isometric front view of a vehicle including the pellet insertion apparatus of FIG. 1.

FIG. 7 is an isometric front view of a vehicle 300 including the pellet insertion apparatus 100 of FIG. 1. The vehicle 300 of FIG. 7 may be referred to as a cart. In the example shown, the vehicle 300 includes a handle 200 and tires 202. The tires 202 and the handle 200 are coupled to the base 127. The pellet insertion apparatus 100 includes a pair of brackets 203. In operation, a strap may be wrapped about the brackets 203 to secure the pellet insertion apparatus 100 to a tree. Thus, based on the coupling provided between the strap and the bracket 203, when the taper 108 and the actuator rod 118 extend to penetrate the tree, the vehicle 300 remains relatively stationary and/or does not substantially move in a direction generally indicated by arrow 204.

Figure 8:
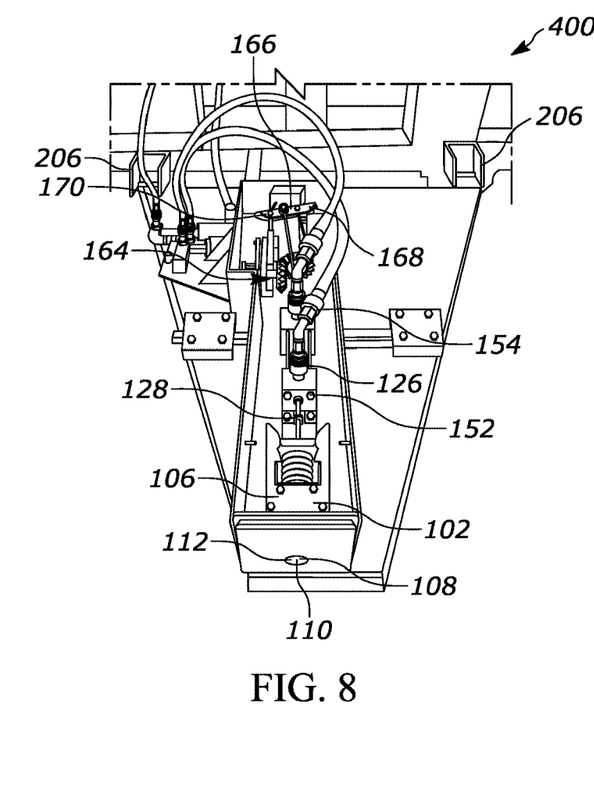
FIG. 8 is an isometric view of another vehicle including the pellet insertion apparatus of FIG. 1.

FIG. 8 is an isometric view of another vehicle 400 including the pellet insertion apparatus 100 of FIG. 1. The vehicle 400 is a fork truck. In the example shown, the base 127 includes a pair of brackets 206. The brackets 206 are adapted to couple the base 127 to the vehicle 400. The brackets 206 may be referred to as fork brackets.

As described above, the insertion apparatus 100 can be used to insert a pellet (or plug) into a tree, whereupon the pellet releases its active ingredient(s) into the tree. The plug according can be used to deliver a relatively uniform, consistent amount of its active component over time to tree tissue at or above the plug's point of insertion into the tree. By using the insertion apparatus, the plug is inserted into an interior region of a live tree (e.g., into the trunk, one or more branches, etc.), and then natural water and/or sap transport within the tree will release and deliver the active component from the plug. The length of the plug and its insertion depth into the trunk are generally selected to provide maximum exposure of the plug's outer surface area to active xylem and/or phloem tissues, which are immediately under the bark of the tree. Suitable depths can be determined by the skilled artisan based on the type and size of tree for injection.

The plug is generally inserted into a lower portion of the tree trunk, typically between the ground and the first set of scaffold limbs or branches above the ground. Injection at 
such point ensures that xylem transport of the active component will reach most or essentially all plant tissue above the insertion point, given that xylem transport of water initiates at the roots and travels upwards to the plant tissue extremities. By way of non-limiting example for various common trees of interest, the plug can be inserted at a height ranging from 0.1 m to 1 m above the ground (e.g., a height of at least 0.1 or 0.2 m and/or up to 0.3, 0.5, or 1 m). In apple trees, for example, the first set of scaffold limbs occur at or above about 0.3 m, so an insertion point below 0.3 m is desirable.

For a given tree, multiple plugs are suitably inserted into the tree at multiple positions distributed around the tree trunk (e.g., circumferentially distributed). The total number of plugs for a given tree increases as the trunk diameter increases. Larger trees need more active ingredient because they have more canopy. Xylem is sectored within the tree such that multiple plugs are needed to attain an even distribution of product in the tree canopy. For example, 2, 3, 4, 5, 6, 8, 10, 12, 15, 20, or more plugs can be distributed around the circumference of the tree trunk at approximately even intervals (e.g., at approximately 360°/n intervals where n is the number of plugs).

The types of trees that can be treated with the composite pesticide plug are not particularly limited and can be trees in a cultivated area (e.g., orchard), a nursery, or a wild area (e.g., forest), for example. Suitable types of trees include fruit trees, ornamental trees, forest trees, etc. Examples of specific fruit trees of interest include apple trees, cherry trees, grapefruit trees, lemon trees, lime trees, nectarine trees, orange trees, peach trees, pear trees, plum trees, and pomegranate trees.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A pellet insertion apparatus for use with trees, the pellet insertion apparatus comprising:
- a housing defining a guide bore and a pellet orifice, the pellet orifice coupled to the guide bore;
- a taper movable between an extended position and a second position within the guide bore and defining a through-bore, the taper including a taper distal end and a taper proximal end, the taper distal end adapted to penetrate a trunk of a tree and extend at least partially into or adjacent to xylem tissue of the tree for pellet insertion;
- a spring positioned to bias the taper away from the extended position;
- a lock coupled to the housing and adapted to secure the taper in the extended position; and
- an actuator rod movable within the through-bore between an extended position, a retracted position, and a plug insertion position, the actuator rod having a rod distal portion, a rod central portion, and a rod proximal portion, the rod distal portion adapted to extend from the taper distal end when the actuator rod is in the extended position, wherein:
  - the rod distal portion in the extended position is adapted to penetrate the trunk of the tree and extend at least partially into or adjacent to the xylem tissue of the tree for pellet insertion,
  - the actuator rod in the retracted position is retracted such that the pellet insertion apparatus is adapted to receive a pellet via the pellet orifice into the through-bore, and
  - movement of the actuator rod between the retracted position and the plug insertion position is adapted to insert a received pellet in the through-bore into the tree, when the taper is secured in the extended position in the tree.

2. The pellet insertion apparatus of claim 1, further comprising an actuator coupled to the actuator rod and adapted to actuate the actuator rod between the extended position, the retracted position, and the plug insertion position.

3. The pellet insertion apparatus of claim 1, wherein the lock is further adapted to secure the taper in the second position.

4. The pellet insertion apparatus of claim 1, wherein the rod central portion includes a release flange, the release flange adapted to engage the taper proximal end to move the taper toward the extended position, the release flange further adapted to engage the lock to release the taper from being secured in the extended position.

5. The pellet insertion apparatus of claim 4, wherein the lock comprises at least two spring-biased arms rotatably coupled to opposing sides of the housing and having inward facing teeth.

6. The pellet insertion apparatus of claim 5, wherein the taper proximal end includes a taper catch, the arms being adapted to interface with the taper catch to secure the taper in the extended position.

7. The pellet insertion apparatus of claim 6, wherein the release flange, via the actuator rod, is rotatable between a first position and a second position, in the first position, the release flange being passable between the arms to engage the taper catch and move the taper toward the extended position, in the second position, the release flange being adapted to engage and outwardly move the arms to release the taper from the extended position.

8. The pellet insertion apparatus of claim 1, wherein the taper distal end comprises a chisel-shaped portion.

9. The pellet insertion apparatus of claim 1, further comprising a pair of brackets to which a strap is adapted to be coupled to secure the pellet insertion apparatus to the tree.

10. The pellet insertion apparatus of claim 1, further comprising a base to which the housing is coupled, wherein the base comprises a pair of fork pockets.

11. The pellet insertion apparatus of claim 1, further comprising a base, a handle, and tires, the tires and the handle coupled to the base.

12. A pellet insertion apparatus for use with trees, the pellet insertion apparatus comprising:
- a base, a handle, and tires, the tires and the handle coupled to the base;
- a housing defining a guide bore and a pellet orifice, the pellet orifice coupled to the guide bore;
- a taper movable between an extended position and a second position within the guide bore and defining a through-bore, the taper including a taper distal end and a taper proximal end, the taper distal end adapted to penetrate a trunk of a tree and extend at least partially into or adjacent to xylem tissue of the tree for pellet insertion;
- a lock coupled to the housing and adapted to secure the taper in the extended position; and
- an actuator rod movable within the through-bore between an extended position, a retracted position, and a plug insertion position, the actuator rod having a rod distal portion, a rod central portion, and a rod proximal portion, the rod distal portion adapted to extend from the taper distal end when the actuator rod is in the extended position, wherein:
the rod distal portion in the extended position is adapted to penetrate the trunk of the tree and extend at least partially into or adjacent to the xylem tissue of the tree for pellet insertion,
the actuator rod in the retracted position is retracted such that the pellet insertion apparatus is adapted to receive a pellet via the pellet orifice into the through-bore, and
movement of the actuator rod between the retracted position and the plug insertion position is adapted to insert a received pellet in the through-bore into the tree, when the taper is secured in the extended position in the tree.

13. The pellet insertion apparatus of claim 12, further comprising a spring positioned to bias the taper away from the extended position.

14. The pellet insertion apparatus of claim 12, wherein the rod central portion includes a release flange, the release flange adapted to engage the taper proximal end to move the taper toward the extended position, the release flange further adapted to engage the lock to release the taper from being secured in the extended position, wherein the lock comprises at least two spring-biased arms rotatably coupled to opposing sides of the housing and having inward facing teeth, wherein the taper proximal end includes a taper catch, the arms being adapted to interface with the taper catch to secure the taper in the extended position.

15. A pellet insertion apparatus for use with trees, the pellet insertion apparatus comprising:
a housing defining a guide bore and a pellet orifice, the pellet orifice coupled to the guide bore;
a base to which the housing is coupled, wherein the base comprises a pair of fork pockets;
a taper movable within the guide bore between an extended position and a second position within the guide bore and defining a through-bore, the taper including a taper distal end and a taper proximal end, the taper distal end adapted to penetrate a trunk of a tree and extend at least partially into or adjacent to xylem tissue of the tree for pellet insertion;
an actuator rod movable within the through-bore between an extended position, a retracted position, and a plug insertion position, the actuator rod having a rod distal portion and a rod proximal portion, the rod distal portion adapted to extend from the taper distal end when the actuator rod is in the extended position; and
an actuator coupled to the actuator rod and adapted to actuate the actuator rod between the extended position, the retracted position, and the plug insertion position,
wherein, the rod distal portion in the extended position is also adapted to penetrate the trunk of the tree and extend at least partially into or adjacent to xylem tissue of the tree for pellet insertion,
the actuator rod in the retracted position is retracted such that the pellet insertion apparatus is adapted to receive a pellet via the pellet orifice into the through-bore, and
movement of the actuator rod between the retracted position and the plug insertion position is adapted to insert a received pellet in the through-bore into the tree, when the taper is secured in the extended position in the tree.

16. The pellet insertion apparatus of claim 15, further comprising an actuator shaft coupled to and actuatable by the actuator, the actuator shaft extending in an opposite direction relative to the actuator rod.

17. The pellet insertion apparatus of claim 16, wherein the actuator comprises a first actuator end and a second actuator end, the actuator rod extending from the first actuator end, the actuator shaft extending from the second actuator end, further comprising a stop coupled adjacent the second actuator end.

18. The pellet insertion apparatus of claim 17, wherein the actuator shaft has a distal shaft end and a central shaft portion carrying a stroke-distance control flange, the stroke-distance control flange, via the actuator shaft, being rotatable between the first position and the second position, in the first position, the stroke-distance control flange being passable between the stop to move the rod distal portion to extend from the taper, in the second position, the stroke-distance control flange to engage the stop to limit forward movement of the rod distal portion relative to the taper.

19. The pellet insertion apparatus of claim 17, further comprising a gear assembly adapted to rotate the actuator shaft between the first position and the second position.

20. The pellet insertion apparatus of claim 19, wherein the gear assembly comprises a first bevel gear and a second bevel gear, the first bevel gear surrounds and rotates with the actuator shaft, the second bevel gear arranged to interface with and rotate the first bevel gear.

21. The pellet insertion apparatus of claim 19, further comprising a pivot including a first pivot portion end and a second pivot portion end, the rod distal portion is adapted to engage the first pivot portion end, the second pivot portion end adapted to interface with the gear assembly to rotate the actuator shaft.

22. The pellet insertion apparatus of claim 20, further comprising a spring coupled to the pivot and arranged to bias the first pivot portion end toward the distal rod portion.

23. The pellet insertion apparatus of claim 20, further comprising a pusher shaft coupled to the second pivot portion end and a ratchet coupled to rotate with the second bevel gear, the pusher shaft adapted to interface with and correspondingly rotate the ratchet in a first direction.

24. The pellet insertion apparatus of claim 23, further comprising a cam coupled to rotate with the ratchet and a follower adapted to follow the cam, an interaction between the follower and the cam to prevent rotation of the cam in a second direction opposite the first direction.

25. The pellet insertion apparatus of claim 24, further comprising a wall defining a through-bore and a gear assembly shaft extending through the through-bore, the second bevel gear, the ratchet, and the cam coupled to rotate with the gear assembly shaft, the follower is rotatably coupled to the wall.

26. The pellet insertion apparatus of claim 16, further comprising a pair of spaced apart mounts, each mount defining a through-bore, the actuator shaft journaled within the through-bores.

* * * * *